United States Patent [19]
Stiffler

[11] Patent Number: 5,737,514
[45] Date of Patent: Apr. 7, 1998

[54] REMOTE CHECKPOINT MEMORY SYSTEM AND PROTOCOL FOR FAULT-TOLERANT COMPUTER SYSTEM

[75] Inventor: Jack J. Stiffler, Hopkinton, Mass.

[73] Assignee: Texas Micro, Inc., Houston, Tex.

[21] Appl. No.: 564,023

[22] Filed: Nov. 29, 1995

[51] Int. Cl.[6] .................................................. G06F 11/00
[52] U.S. Cl. ........................... 395/182.11; 395/182.04; 711/135
[58] Field of Search ..................... 364/228.3; 395/180, 395/181, 181.01, 182.02, 182.03, 182.05, 182.08, 182.09, 182.11, 182.14, 182.18, 488, 489, 183.17; 711/118, 133, 135

[56] References Cited

U.S. PATENT DOCUMENTS

| | | | |
|---|---|---|---|
| 3,588,829 | 6/1971 | Boland | 340/172.5 |
| 3,736,566 | 5/1973 | Anderson et al. | 340/172.5 |
| 3,761,881 | 9/1973 | Anderson et al. | 340/172.5 |
| 3,803,560 | 4/1974 | DeVoy et al. | 340/172.5 |
| 3,889,237 | 6/1975 | Alferness et al. | 340/172.5 |
| 3,979,726 | 9/1976 | Lange et al. | 340/172.5 |
| 4,020,466 | 4/1977 | Cordi et al. | 340/172.5 |
| 4,044,337 | 8/1977 | Hicks et al. | 364/200 |
| 4,164,017 | 8/1979 | Randell et al. | 364/200 |
| 4,228,496 | 10/1980 | Katzman et al. | 364/200 |
| 4,373,179 | 2/1983 | Katsumata | 364/200 |
| 4,393,500 | 7/1983 | Imazeki et al. | 371/13 |

(List continued on next page.)

FOREIGN PATENT DOCUMENTS

| | | |
|---|---|---|
| 55-41528 A | 3/1980 | Japan . |
| 55-115121 A | 9/1980 | Japan . |
| 58-31651 A | 2/1983 | Japan . |

OTHER PUBLICATIONS

N.Bowen and D.Pradhan, "Processor– and Memory–Based Checkpoint and Rollback Recovery," 1993 IEEE Transactions on Computers, pp. 22–30.

Y.Lee and K.Shin, "Rollback Propagation Detection and Performance Evaluation of FTMR$^2$M —A Fault Tolerant Multiprocessor," 1982 IEEE Transactions on Computers, pp. 171–180.

C.Kubiak et al., "Penelope: A Recovery Mechanism for Transient Hardware Failures and Software Errors," 1982 IEEE Transactions on Computers, pp. 127–133.

A.Feridun and K.Shin, "A Fault–Tolerant Multiprocessor System with Rollback Recovery Capabilities," 1981 IEEE Transactions on Computers, pp. 283–298.

P.Lee et al., "A Recovery Cache for the PDP–11," i IEEE Transactions on Computers, vol. C–29, No. 6, Jun. 1980, pp. 546–549.

M. Banatre, A. Gefflaut, C. Morin, "Scalable Shared Memory Multi–Processors: Some Ideas to Make Them Reliable", in Hardware and Software Architectures for Fault Tolerance, Springer–Verlag, 1994 Lecture Notes in Computer Science, presented after Jun. 10, 1993.

*Primary Examiner*—Albert Décady
*Attorney, Agent, or Firm*—Wolf, Greenfield & Sacks, P.C.

[57] ABSTRACT

A mechanism for maintaining a consistent, periodically updated state in main memory without constraining normal computer operation is provided, thereby enabling a computer system to recover from faults without loss of data or processing continuity. In this invention, a first computer includes a processor and input/output elements connected to a main memory subsystem including a primary element. A second computer has a remote checkpoint memory element, which may include one or more buffer memories and a shadow memory, which is connected to the main memory subsystem of the first computer. During normal processing, an image of data written to the primary memory element is captured by the remote checkpoint memory element. When a new checkpoint is desired (thereby establishing a consistent state in main memory to which all executing applications can safely return following a fault), the data previously captured is used to establish a new checkpointed state in the second computer. In case of failure of the first computer, the second computer can be restarted to operate from the last checkpoint established for the first computer. This structure and protocol can guarantee a consistent state in main memory, thus enabling fault-tolerant operation.

14 Claims, 7 Drawing Sheets

U.S. PATENT DOCUMENTS

| | | | |
|---|---|---|---|
| 4,403,284 | 9/1983 | Sacarisen et al. | 364/200 |
| 4,413,327 | 11/1983 | Sabo et al. | 364/900 |
| 4,426,682 | 1/1984 | Riffe et al. | 364/200 |
| 4,459,658 | 7/1984 | Gabbe et al. | 364/200 |
| 4,484,273 | 11/1984 | Stiffler et al. | 364/200 |
| 4,566,106 | 1/1986 | Check, Jr. | 371/67 |
| 4,654,819 | 3/1987 | Stiffler et al. | 364/900 |
| 4,734,855 | 3/1988 | Banatre et al. | 364/200 |
| 4,740,969 | 4/1988 | Fremont | 371/12 |
| 4,751,639 | 6/1988 | Corcoran et al. | 364/200 |
| 4,817,091 | 3/1989 | Katzman et al. | 395/182.06 |
| 4,819,154 | 4/1989 | Stiffler et al. | 364/200 |
| 4,819,232 | 4/1989 | Krings | 371/9 |
| 4,905,196 | 2/1990 | Kirrmann | 365/200 |
| 4,924,466 | 5/1990 | Gregor et al. | 371/12 |
| 4,941,087 | 7/1990 | Kap | 364/200 |
| 4,958,273 | 9/1990 | Anderson et al. | 364/200 |
| 4,964,126 | 10/1990 | Musicus et al. | 371/36 |
| 4,965,719 | 10/1990 | Shoens et al. | 364/200 |
| 5,157,663 | 10/1992 | Major et al. | 371/9.1 |
| 5,214,652 | 5/1993 | Sutton | 371/9.1 |
| 5,235,700 | 8/1993 | Alaiwan et al. | 395/182.11 |
| 5,239,637 | 8/1993 | Davis . | |
| 5,247,618 | 9/1993 | Davis . | |
| 5,269,017 | 12/1993 | Hayden et al. | 395/527 |
| 5,271,013 | 12/1993 | Gleeson | 395/182.08 |
| 5,276,848 | 1/1994 | Gallagher et al. | 395/425 |
| 5,313,647 | 5/1994 | Kaufman et al. | 395/700 |
| 5,325,517 | 6/1994 | Baker et al. | 395/575 |
| 5,325,519 | 6/1994 | Long et al. | 395/575 |
| 5,327,532 | 7/1994 | Ainsworth et al. | 395/200 |
| 5,408,649 | 4/1995 | Besheaus et al. | 395/182.08 |
| 5,488,716 | 1/1996 | Schneider et al. | 395/182.11 |
| 5,488,719 | 1/1996 | Schultz . | |
| 5,504,861 | 4/1996 | Crockett et al. | 395/182.11 |

REMOTE CHECKPOINT MEMORY SYSTEM AND PROTOCOL FOR FAULT-TOLERANT COMPUTER SYSTEM

FIELD OF THE INVENTION

The present invention is related to computer memory systems and checkpointing protocols, particularly for fault tolerant computer systems.

BACKGROUND OF THE INVENTION

Fault tolerance in computers is generally realized in either of two ways: either through a hardware-intensive technique called masking, or a software-based approach called checkpointing. Masking is achieved by replicating hardware and executing computer programs on several independent units in parallel. The outputs of these units are then compared to determine their validity. In the simplest and oldest embodiment of this technique, three complete computers are implemented and a simple majority vote on their outputs is used to determine the "correct" output. If at least two of the computers are functioning properly and the voter system itself is also working correctly, the potentially incorrect output of the malfunctioning computer is outvoted and the correct answer is indeed presented to the user. While there are other embodiments of masking that are somewhat more efficient, masking systems generally suffer from the significantly increased cost of the hardware that must be added to mask out the effect of a faulty component. In addition, masking protects only against hardware faults; a software bug that causes one unit to malfunction will also cause other units running the same software to malfunction in the same way. All outputs will contain the same error which as a result will, as a result, pass undetected.

The alternative technique called checkpointing has the potential of providing tolerance to faults in a considerably more cost-effective way. This technique requires that the state of the entire computer be periodically recorded at time intervals designated as checkpoints. A fault may be detected by either a hardware fault monitor (e.g., by a decoder operating on data encoded using an error detecting code, by a temperature or voltage sensor, or by one device monitoring another identical device) or by a software fault monitor (e.g., an assertion executed as part of the executing code that checks for out-of-range conditions on stack pointers or addresses into a data structure). If a fault is detected, recovery involves first diagnosing and circumventing a malfunctioning unit, if possible, and then returning the system to the last checkpoint and resuming normal operation from that point.

Recovery is possible if sufficient hardware remains operational after any elements identified as faulty during the recovery process have been circumvented. In a multiprocessor system, for example, the system can continue to operate as long as at least one of the processors continues to function. Similarly, a system that can remap memory or redirect I/O through alternate ports can survive the loss of memory or I/O resources as well. Moreover, most faults encountered in a computer system are transient or intermittent in nature, exhibiting themselves as momentary glitches. It is therefore generally possible to recover from such faults without circumventing any hardware. However, since transient and intermittent faults can, like permanent faults, corrupt the data that is being manipulated at the time of the fault, it is necessary to have a consistent state to which the computer can return following such events. This is the purpose of the periodic checkpointed state.

Since checkpoints are typically established every 50 milliseconds or so, rolling an executing program back to its last checkpoint is generally entirely transparent to a user. If handled properly, all applications can be resumed from their last checkpoints with no loss of continuity and no contamination of data.

There are two primary advantages to checkpointing relative to masking. First, checkpointing is considerably less expensive to implement. Second, checkpointing offers protection against software as well as hardware faults. The first advantage simply reflects the fact that checkpointing does not require massive replication of hardware. The second advantage is a consequence of the fact that most software bugs remaining in well tested, mature software are exposed only in exceptional situations. Were this not true, the bugs would have been found and removed during normal testing. Such exceptional situations are generally caused by some asynchronous event such as an interrupt that forces program execution to follow a sequence that would not otherwise have been followed. If the system is forced to roll back to a consistent state and continue forward, that is, if the software bug is treated like a hardware transient, it is highly unlikely that the system will encounter exactly the same exception in exactly the same state as before. Consequently, it is highly unlikely that it will encounter the same bug a second time.

Checkpointing also suffers from two potential disadvantages relative to masking. First, masking generally results in instantaneous or near-instantaneous recovery from faults. Any resulting errors are simply masked, so no explicit recovery is necessary. Checkpointing requires that certain software routines be executed to diagnose the problem and to circumvent any permanently malfunctioning component of the computer. As a consequence, the resulting recovery time, typically on the order of one second, may preclude the use of this technique for achieving fault tolerance for some real-time applications where response times on the order of milliseconds or less are required. In applications in which humans directly interact with the computer, e.g., in transaction processing applications; however, a momentary interruption of a second or so is entirely acceptable and, in fact, is generally not even perceptible. Thus, this potential disadvantage of checkpointing is not relevant to that class of applications.

Second, checkpointing has traditionally been achieved at the application level. Thus, the application programmer has been required to be concerned about what data has to be checkpointed, and when it should be done. This requirement places a serious burden on the programmer and has seriously impeded the widespread use of checkpointing as a means for achieving fault tolerance.

More recently, techniques have been developed that allow checkpointing to be done at the system software level so that the application programmer need not be concerned with attempting to identify the data that has to be checkpointed or even be aware that checkpointing is taking place. For this to be possible, the system itself must be able to establish periodic checkpoints, regardless of the applications that it might be running. U.S. Pat. Nos. 4,654,819 and 4,819,154 to Stiffler describe a computer system capable of doing exactly that. The system accomplishes this kind of checkpointing by requiring each of its processors to retain all modified data in its local cache until it is time to establish a new checkpoint at which time all modified data is flushed out to main memory. Such caches are sometimes called blocking caches. Prior to flushing its blocking cache, a processor does a context switch during which it places the contents of its internal registers, including its program counter, on a stack which is flushed out with all the other modified data. Consequently, memory is updated all at once with data that is internally consistent, thereby establishing a checkpoint to which the system can safely return should it subsequently suffer a fault. To guarantee the ability to survive both main memory faults and faults experienced during the flushing operation itself, memory is duplicated, with each data item stored in both a primary location and a shadow location.

While this technique does accomplish its goal of establishing checkpoints without burdening the application programmer, it does have certain disadvantages due to its dependence on the use of a blocking cache. Since a processor cannot write any cache line back to main memory unless it writes back all currently modified lines at the same time, any cache overflow or any request by one processor for data held in another processor's cache requires the processor releasing the data to flush its entire cache. This requirement precludes the use of standard cache coherency protocols (for example, the protocol described in U.S. Pat. No. 5,276,848 to Gallagher) and creates potential porting and performance problems when programs are executed that rely on such standard protocols.

Other methods for capturing data for checkpointing purposes have been proposed, for example, by Kirrmann (U.S. Pat. No. 4,905,196) and by Lee et al. ("A Recovery Cache for the PDP-11", IEEE Trans. on Computers, June, 1980). Kirrmann's method involves a cascade of memory storage elements consisting of a main memory, followed by two archival memories, each of the same size as the main memory. Writes to the main memory are also written by the processor into a write buffer. When it is time to establish a checkpoint, the buffered data is then copied by the processor first to one of the archival memories and then to the second, although techniques are also described that eliminate the need for one of the copies. The two archival memories ensure that at least one of them contains a valid checkpoint, even if a fault occurs while a buffer-to-memory copy is in progress. Some problems with this architecture include a triplication of memory, the use of slow memory for the archival memory and the effect on processor performance since the three memory elements are different ports on the same bus.

The paper by Lee et al. discusses a method for saving data in a recovery cache before updated data is written to memory, for all memory locations falling within an application-specified range of addresses. This method involves converting all writes to memory within the range specified by the application into read-before-write operations. If a fault occurs during the execution of the application, the contents of the recovery cache are stored back into main memory, thereby restoring it to the state that it was when the application began its current execution. One problem with this method is that it slows the host system due to interference with memory cycles by the read-then-write operations which are required. It also requires checkpointing to be handled or considered by the application programmer.

Other techniques have been developed to establish mirroring of data on disks rather than in main memory. Since disk access is orders of magnitude slower than main memory access, such schemes have been limited to mirroring data files, that is, to providing a backup to disk files should the primary access path to those files be disabled by a fault. No attempt is made to retain program continuity or to recover the running applications transparently to the users of the system. In some cases, it is not even possible to guarantee that mirrored files are consistent with each other, only that they are consistent with other copies of the same file. U.S. Pat. No. 5,247,618 discloses one example of such a scheme.

SUMMARY OF THE INVENTION

Embodiments of the present invention provide a device and process for maintaining, in a computer system, a consistent, periodically updated checkpoint state in the computer system's main memory while allowing the use of conventional cache coherency protocols and non-blocking caches. Embodiments of the invention provide a main memory which is accessed by a processor through one or more logical ports in which a primary memory element and a checkpoint memory element are both coupled to the port. The primary memory element is accessed in the same way as a standard main memory. The checkpoint memory element captures writes to the main memory which are detectable because the checkpoint memory element is connected to the same port as the primary memory element. These captured writes are then used to ensure the existence of a consistent checkpoint state in the main memory. Such a computer system with the appropriate detection and circumvention procedures can recover from faults without loss of data integrity or processing continuity.

In one embodiment of the present invention, a remote checkpoint memory element, including a buffer memory and a second random-access memory element, is provided in a backup computer located remotely from a primary computer. The backup and primary computers are connected by a checkpoint communication link. During normal processing, data written to the main memory in the primary computer is also sent over the dedicated checkpoint communication link to the buffer memory in the remote checkpoint memory element in the backup computer. When a checkpoint is to be established, the data previously captured in the buffer memory is copied to the random-access memory of the remote checkpoint memory element of the backup computer system. In the event of a failure of the primary computer, the backup computer takes over processing applications that were previously being processed by the primary computer. The backup computer processes the applications starting from the checkpoint state stored in the shadow memory element of the remote checkpoint memory element.

In another embodiment of the present invention, the remote checkpoints buffer are provided to allow N+1 redundancy by configuring computers in a logical ring with each computer acting as a backup for one of its adjacent neighbors.

In a system in accordance with this invention, input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations can simply be restarted.

The appropriate disposition of communications I/O activities depends upon the communication protocol. For those protocols that accommodate the possible duplication of messages, the pending I/O can be restarted. For those that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

The mechanisms described herein can guarantee the existence of a consistent checkpoint state from which the computer can resume operation following a fault, thus supporting fault-tolerant computer system operation.

BRIEF DESCRIPTION OF THE DRAWINGS

For a better understanding of the present invention, reference is made to the drawings which are incorporated herein by reference and in which.

DETAILED DESCRIPTION

The present invention will be more completely understood through the following detailed description which should be read in conjunction with the attached drawings in which similar reference numbers indicate similar structures. Reference is made to Applicant's co-pending U.S. patent application Ser. No. 08/258,165, filed Jun. 10, 1994, which is incorporated herein by reference.

Figure 1:
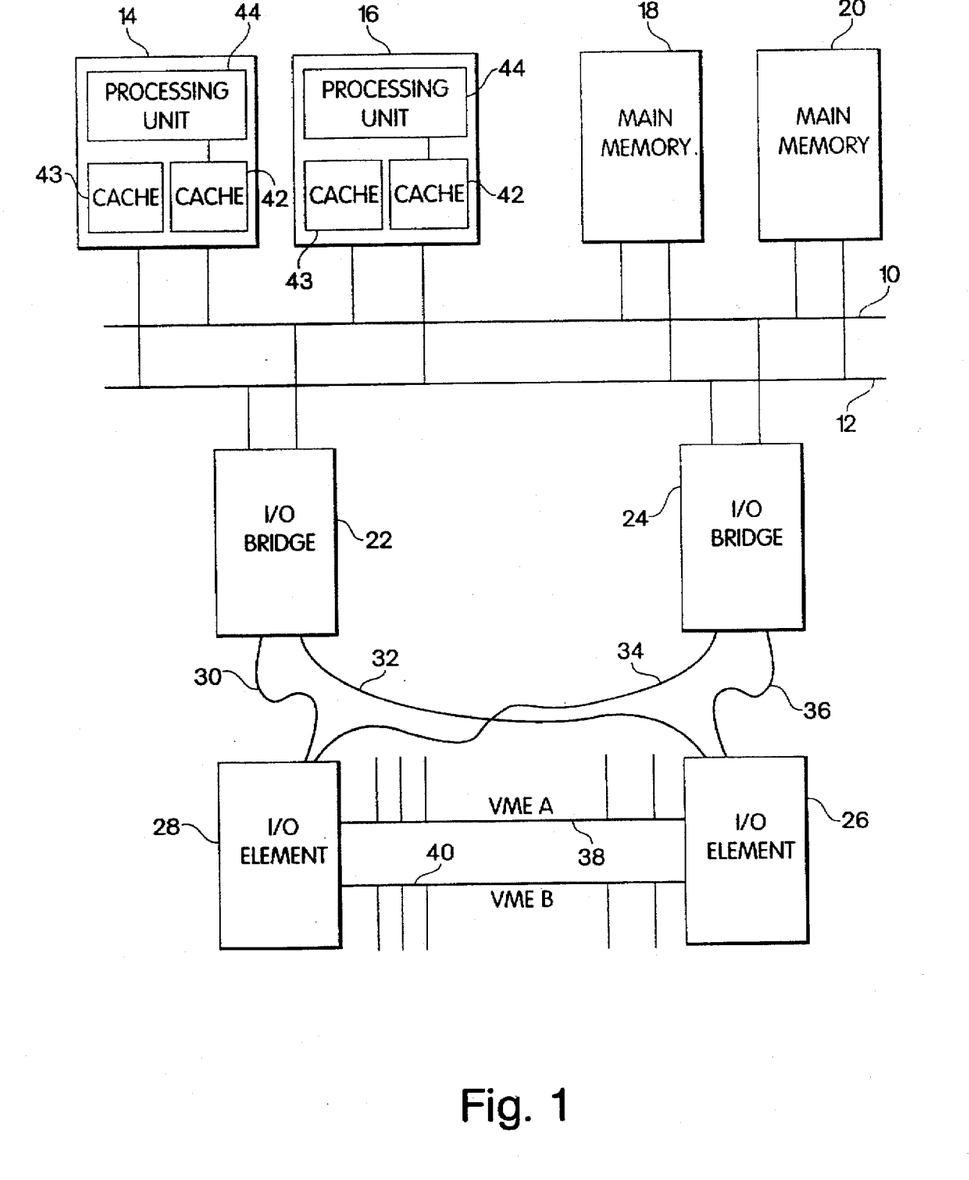
FIG. 1 is a block diagram of a computer system which uses a main memory structure of one embodiment of the present invention.

FIG. 1 is a block diagram of a computer system 11 with which the invention generally may be used. One or more processing elements 14 and 16 are connected to one or more main memory systems 18 and 20 via interconnection mechanisms 10 and 12 such as a bus or crosspoint switch. One or more input/output (I/O) subsystems 22 and 24 are also connected to the interconnection mechanism 10 (12). Each I/O subsystem comprises an input/output (I/O) element or bridge 26 (28) and one or more buses 30 and 32 (34 and 36). An I/O element 26 (28) may also be connected to any standard I/O bus 38 (40), such as a VME bus. For ease of description, only one of each of these systems and subsystems is referred to below.

Each processing element, e.g., 14, includes a processing unit 44 connected to a cache 42. This connection also connects the processing unit 44 and the cache 42 to the interconnection mechanism 10. The processing unit 44 may be any standard microprocessor unit (MPU). For example, the PENTIUM microprocessor, available from Intel Corporation, is suitable for this purpose. The processing unit 44 operates in accordance with any suitable operating system, as is conventional. A processing element 14 may include dual processing units 44 for self-checking purposes.

The cache 42 is either a write-through or a write-back type of cache and has an arbitrary size and associativity and may consist of more than one cache level in a hierarchical structure. The processing unit 44 may store in the cache 42 either data only or both computer program instructions and data. In the former case, an additional similar instruction cache 43 may be connected to the processing unit 44 for the processing unit 44 to store computer program instructions. This connection also connects the instruction cache 43 to the interconnection mechanism 10. If this system is a multiprocessing computer system, each processing unit 44 may use any conventional mechanism to maintain cache coherency, such as bus snooping. The cache 42 is connected to a main memory system, e.g., 18, via interconnection mechanism 10 or 12.

Figure 2:
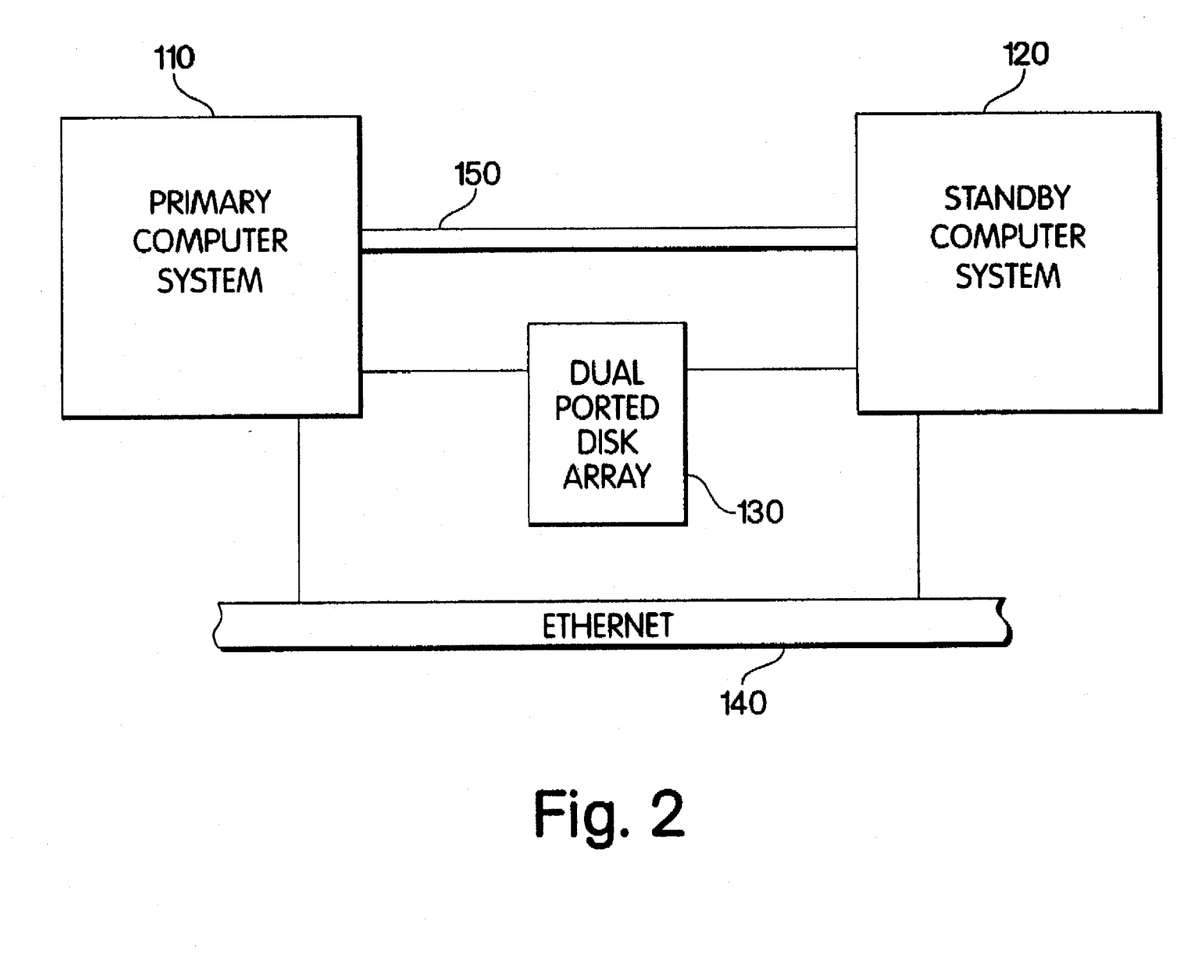
FIG. 2 is a block diagram of a fault tolerant computer system using remote checkpoint buffering in accordance with one embodiment of the present invention.

One embodiment of a fault tolerant computer system according to the present invention utilizing remote checkpoint buffering is shown in FIG. 2. In the embodiment shown in FIG. 2, a primary computer system 110 is coupled to a standby computer system 120 through a high-speed data link 150. The standby computer system is used to establish a checkpoint remotely in memory of the standby computer system. As shown in FIG. 2, the primary computer system 110 and the standby computer system 120 may also be interconnected, for example, through an Ethernet system 140, and may share a common dual ported disk array 130 and other dual-ported storage and communication devices.

Figure 3:
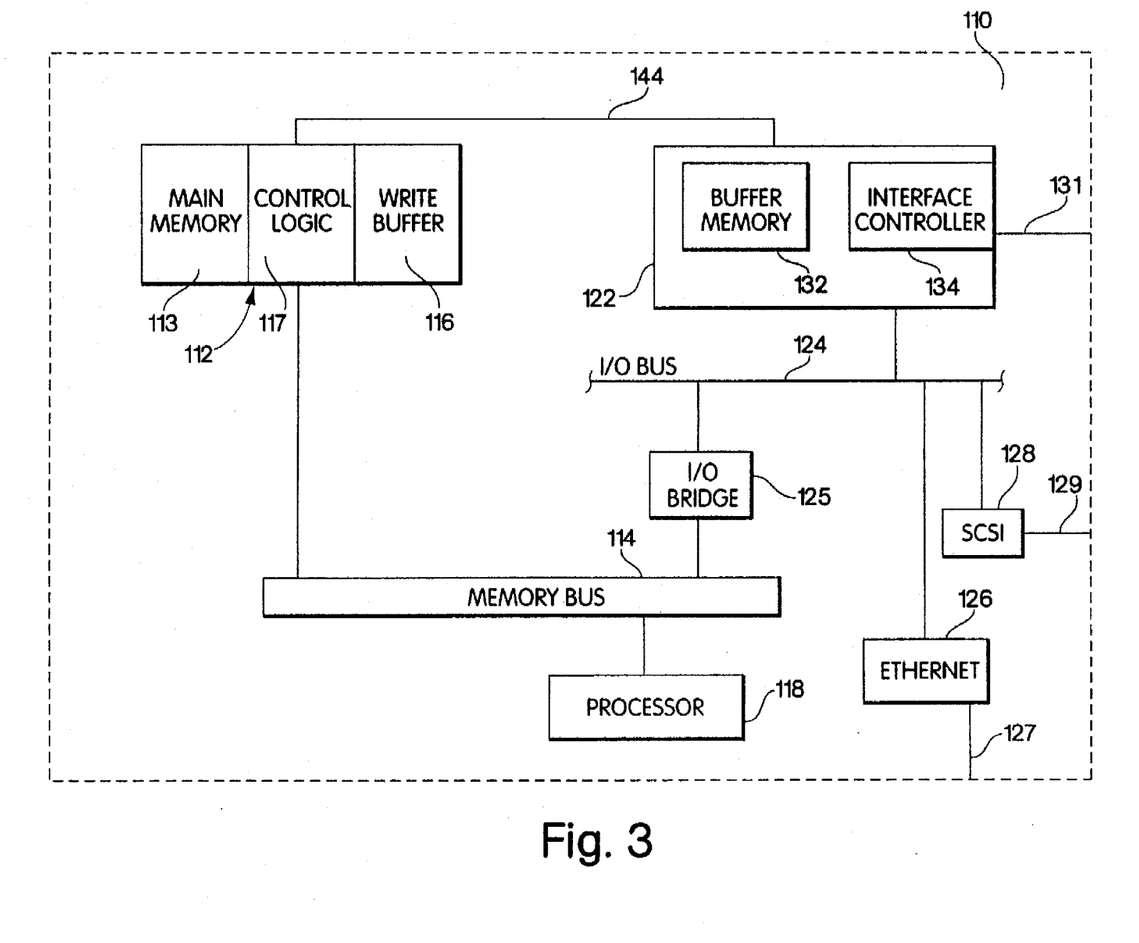
FIG. 3 is a block diagram illustrating in more detail the primary computer system and the standby computer system of FIG. 2.

In a preferred version of this embodiment, the primary computer system 110 and the standby computer system 120 are substantially identical computers. FIG. 3 shows further details of one embodiment of the primary computer system 110. It should be understood that the standby computer system 120 has the same structure as the primary computer system 110 shown in FIG. 3.

The primary computer system 110 includes a memory subsystem 112 comprising a main memory 113, a write buffer 116 and memory control logic 117 which controls data transfer within the memory subsystem 112. The memory subsystem 112 is coupled to a memory bus 114. In accordance with the description of FIG. 1, a representative primary computer system 110 of FIGS. 2 and 3 also includes one or more processors 118 coupled to the memory bus 114 (or other connection), a remote checkpoint interface 122, an I/O bus 124, an Ethernet interface 126, and an external storage interface shown as a SCSI controller 128.

The I/O bus is coupled to the memory bus through an I/O bridge 125. The remote checkpoint interface 122 includes a buffer memory 132 and an interface controller 134. The remote checkpoint interface is coupled to the memory 112 through connection 144. The interface controller 134 is coupled to a high speed I/O port 131 for connecting the primary computer system to the high speed data link 150. The SCSI controller 128 is coupled to a SCSI I/O port 129 for connecting the primary computer system to the dual ported disk array 130. The Ethernet interface is coupled to an Ethernet I/O port 127 for connecting the primary computer system to the Ethernet 140.

The process of using this system to maintain a consistent state in main memory following a fault will now be described. In contrast to systems such as in U.S. Pat. No. 4,654,819, this process allows data to be passed from one processing element 14 to another processing element 16 without requiring the entire cache 42 of processing unit 14 to be flushed. If all processing units 44 in the computer system 11 have access to all buses or communication paths to the main memories, each processing unit 44 may use conventional bus snooping methods to assure cache coherency. If all processing units 44 do not have access to all system buses, the processing units 44 may use other well-known cache coherency techniques instead.

The operation of this embodiment, herein referred to as remote checkpointing, and shown in FIGS. 2 and 3, is generally similar to that described in Applicant's co-pending application referenced above in which checkpointing occurs locally. However, with remote checkpointing, the main memory 113 of the standby computer system 120 acts as the checkpoint memory for the main memory 113 of the primary computer system 110 and contains the state of the main memory 113 of the primary computer at the last checkpoint. Data written to the main memory 113 of the primary computer system is also captured by the write buffer 116 of the primary computer system under the control of the memory control logic 117. It should be understood that an access may involve a partial or an entire cache line. The write buffer is of sufficient size to provide buffering of the data to accommodate any delays associated with transferring the data over the bus 144. The data is transferred from the write buffer 116 to the remote checkpoint interface 122 of the primary computer system where additional buffering is provided to accommodate any delays associated with the high-speed data link 150. The data is then transferred over the high-speed data link 150 to the remote checkpoint interface 122 of the standby computer system 120 and stored in buffer memory 132 of the standby computer system.

All writes to the main memory 113 of the primary computer system (including lines written to memory during a cache flushing) are thus also written, along with their physical memory locations, to the buffer memory 132 of the standby computer system. When processor 118 of the primary computer system, and any additional processors coupled to memory bus 114, have completed a cache flush, the operating system in the primary computer system notifies the standby computer system by way of the remote control interface. The contents of the buffer memory 132 of the standby computer system are then transferred into main memory 113 of the standby computer system establishing a checkpoint in the main memory 113 of the standby computer system.

To checkpoint a consistent system state, all processors flush their caches in a synchronized manner. Once a processing element 14 has begun a flush, it cannot resume normal operation until all other processing elements 14 have completed their flushes, except under certain conditions discussed below.

Processor cache flushing is synchronized because the buffer memory needs to know which data should be copied to the main memory 113, and which data should not. That is, the buffer memory needs to distinguish between post-flush and pre-flush data. Thus, if the buffer does not know what processor is sending data, all processors must complete their flushes before normal operation can begin in order to maintain consistency. Synchronization is preferably controlled using a test-and-set lock or equivalent operation using a designated location in, for example, main memory of the primary computer, such as indicated at 80 in FIG. 5, to store the lock value. To ensure that it is possible to recover from primary memory element failures as well as other failures, this designated location is preferably implemented as part of a status register.

Figure 6A:
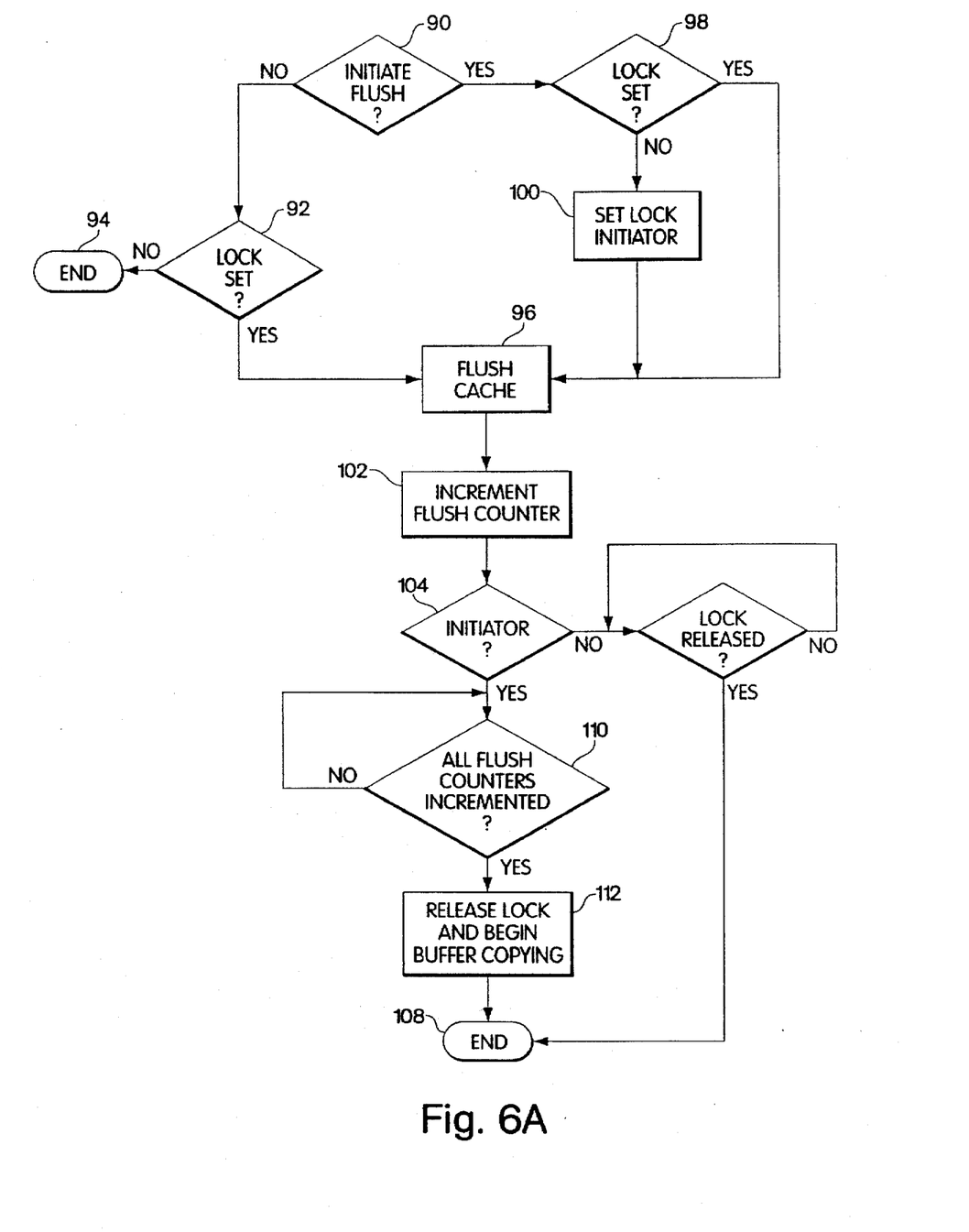
FIG. 6A is a flowchart describing how each processing unit controls flushing of its cache to maintain main memory consistency.

At periodic intervals, each processing unit 44 determines whether it should initiate a flush operation as indicated at step 90 in FIG. 6A. The processing unit 44 can make this determination in a number of different ways. Typically, a flush may be initiated after a fixed period of time has elapsed.

If this processing unit 44 does not need to initiate a flush, then it examines the designated memory location 80 to determine whether another processing unit 44 has already set the lock (step 92). If the lock is not set, this process ends as indicated at 94. Otherwise, if the lock is set, this processing unit 44 flushes its cache 42 in step 96. The effect of the flushing operation is to store all lines in the cache (or preferably only those lines that have been modified since the last flush) to the main memory 113 of the computer and to the write buffer 116 as well. Prior to the actual flushing operation, the processing unit 44 saves its state in the cache 42 so that this information is flushed as well.

Input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those protocols that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

If the processing unit 44 determines in step 90 that it should initiate a flush, it then determines whether the lock is already set in step 98, similar to step 92. If the lock is already set, the processing unit 44 continues by flushing its cache 42 in step 96. Otherwise, it sets the lock in step 100, sends a message to the other processors to trigger their flush line operations thereby identifying itself as the initiator of the flush, before flushing its cache 42.

Figure 5:
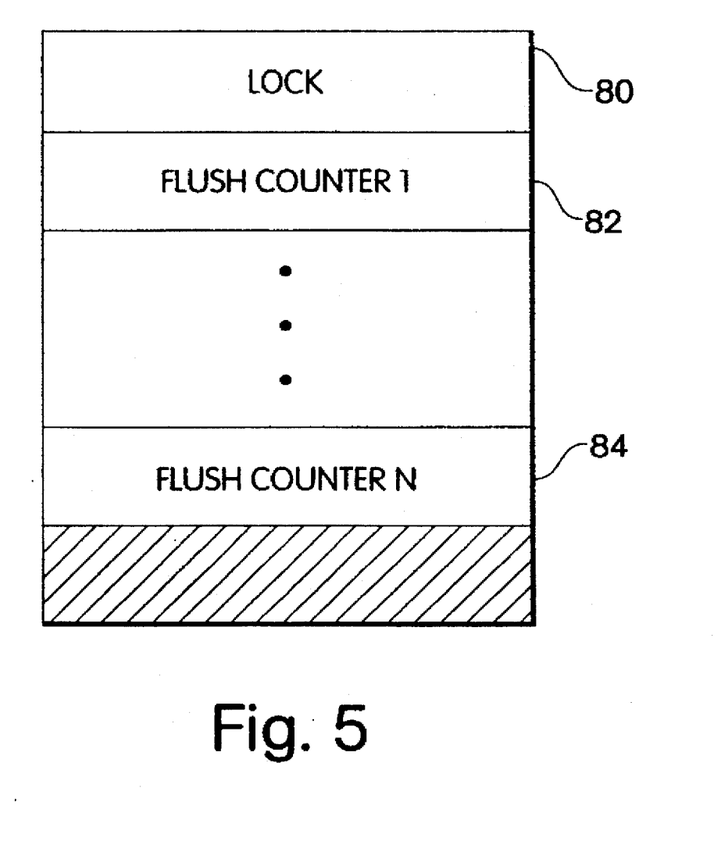
FIG. 5 is a diagram of memory locations used by the processing units to maintain main memory consistency.

After a processing unit 44 flushes its cache 42 in step 96, it increments its corresponding flush counter in step 102. As indicated in FIG. 5, each processing unit 44 has a flush counter, such as shown at 82 and 84, which are predetermined designated locations in main memory 113. After the flush counter (e.g., 82) is incremented, the processing unit 44 determines whether it is the initiator of this flush sequence (step 104). If it is not the initiator, it then waits until the lock is released in step 106. When the lock is released, this process ends in step 108 and the processing unit 44 may resume normal operations.

If the processing unit 44 is the initiator of the flush as determined in step 104, it then waits until all flush counters (82–84) are incremented in step 105. Once all flush counters have been incremented, this processing unit 44 sends a commit command to the memory control logic 117 to copy data in the write buffer 116 into the main memory 113 of the standby computer as described above. Once this command has been sent, the flush lock is released and the processing units 44 can resume normal processing. The loops around steps 106 and 110 should have time-out protection which triggers fault recovery procedures, in the event of a failure during flushing operations.

Note that the flush counters described here may be 1-bit counters and hence can also readily be implemented as part of the status register in the checkpoint memory element. The bits can be set individually by each processor and then automatically reset when the initiator sends the commit command.

Some performance advantage can be gained if certain non-standard bus protocols are also implemented. For example, if the bus protocol allows the memory subsystem 48 to distinguish between processing elements 14, or at least to identify whether a line being stored has been written by a processing element 14 that has completed its ith flush or is still executing its ith flush, or at least to distinguish pre-flush from post-flush data, a processing element 14 does not have to wait until all other processing elements have completed their flushes before it resumes normal operation. In this case, consistency is maintained in main memory by requiring a processing element 14 to suspend normal operation after completing its ith flush only until all other processing elements 16 have also at least begun (but not necessarily completed) their ith flushes.

Figure 6B:
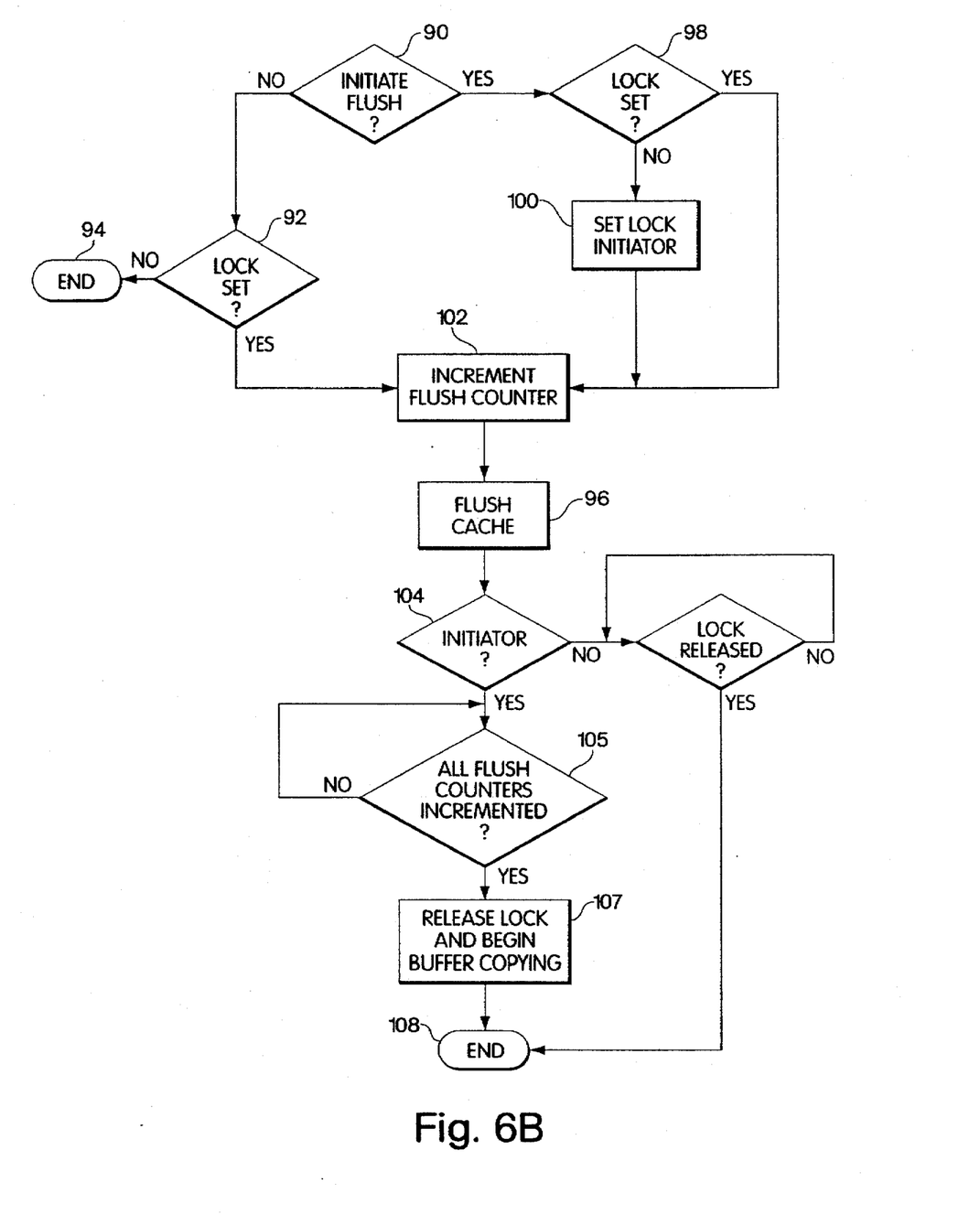
FIG. 6B is a flowchart describing an alternate method by which each processing unit controls flushing of its cache to main memory.

This relaxed synchronization restriction still ensures the existence of a consistent checkpoint state. That is, it guarantees that a processing element 16 that has not begun its flush does not receive post-flush modified data from another processing element 14 that has completed its flush and resumed normal processing. This less restrictive synchronization protocol can be allowed if the memory subsystem can distinguish between data that is being written as part of the flushing operation and data that is being written by a processing element 14 that has completed its flush. To implement this kind of cache flushing synchronization, the order and placement of steps 96 and 102 in FIG. 6A may be reversed as shown in FIG. 6B.

In the event of a failure of the primary computer system, the main memory 113 of the standby computer system contains the state of the primary computer system at the last checkpoint. The standby computer system can, using standard techniques, activate connections to all dual ported I/O devices, such as the dual ported disk array 130, and take over the processing of applications that were running on the primary computer system at the time of failure without disrupting the applications or losing any of the associated data. Alternatively, after a failure, the standby computer system may copy the contents of its main memory 113 through the high-speed data link 150 to the main memory 113 of the primary computer system so that the primary computer system can resume operation from the previous checkpoint stored in the main memory of the standby computer system.

The standby computer system, as described above, is intended to be idle in a standby mode while providing the checkpoint memory for the primary computer system. However, in the embodiment of the fault tolerant computer system shown in FIG. 1, the computer system may operate symmetrically such that each of the computer systems 110 and 120 provide a remote checkpoint memory for the other computer system. In this case, the standby computer system may be running applications while providing the checkpoint memory for the primary computer system. For symmetrical operation, the remote checkpoint interface 122 is preferably integrated with the checkpoint memory. The buffer memory 132 and the main memory 113 of each computer are physically co-located on the memory bus. This avoids the need to tie up the I/O and memory buses for buffer-to-shadow stores, an operation that will reduce the throughput of a computer system operating in a mode other than standby mode.

After a failure of one of the computers, the surviving computer 1) may run applications of both computers (itself and the failed computer) with a decrease in throughput for any one application, or 2) may terminate its own applications and only run those of the failed computer, or 3) may run a subset of the combined applications that are of sufficiently high priority.

Figure 4:
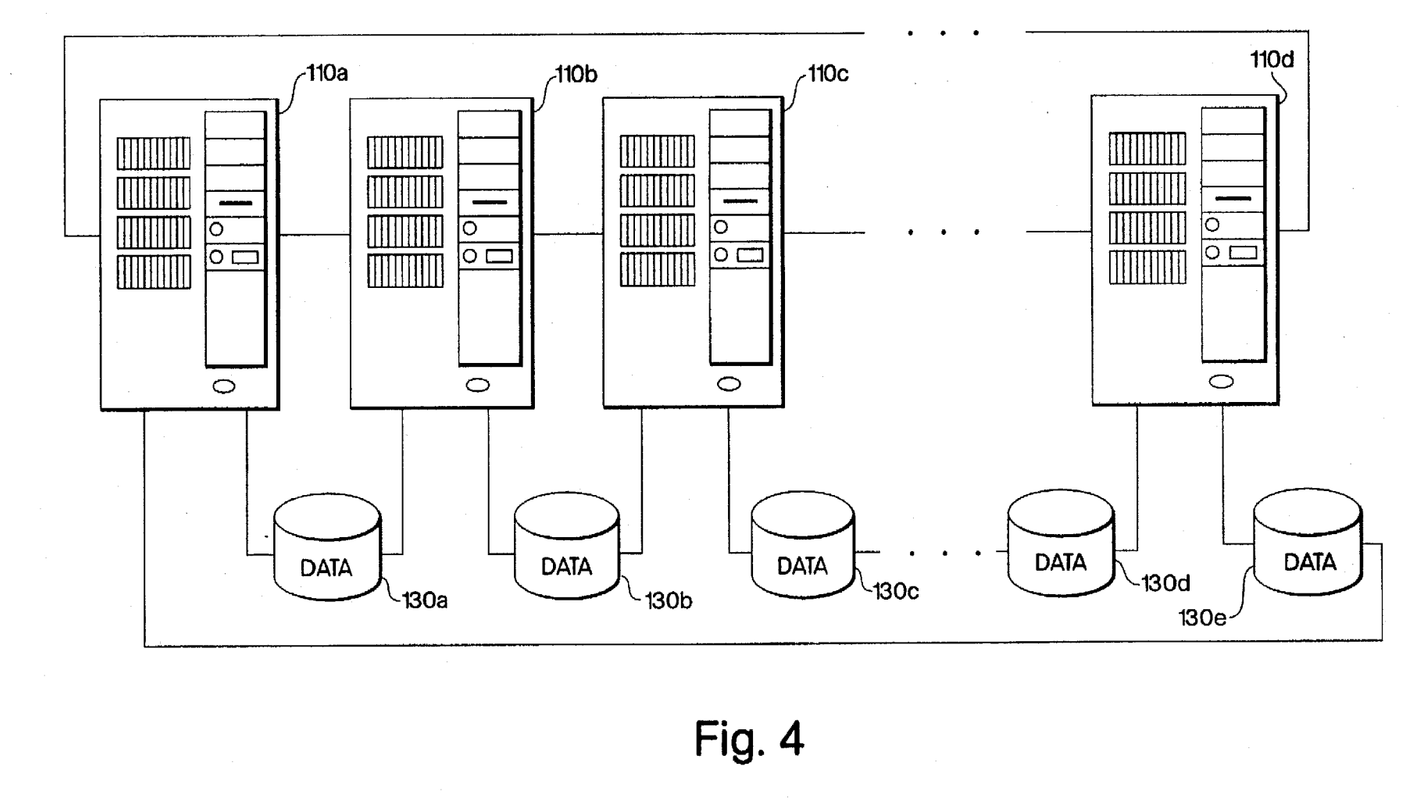
FIG. 4 is a block diagram of a remote checkpoint memory scheme in accordance with one embodiment of the present invention utilizing N+1 redundancy.

FIG. 4 shows another embodiment of the present invention utilizing remote checkpoint buffering. In the embodiment shown in FIG. 4, the concept of remote checkpoint buffering is extended to allow N+1 redundancy by configuring computers 110a, 110b, 120c and 120d in a logical ring, with each computer serving as a backup for an adjacent computer in the ring. In the embodiment shown in FIG. 4, computer system 110b provides the shadow memory for computer system 110a, computer system 110c provides the shadow memory for computer system 110b, computer system 110d provides the shadow memory for computer system 110c and computer system 110a provides the shadow memory for computer system 110d. I/O data devices 130a, 130b, 130c, 130d and 130e are dual ported devices coupled between immediate neighboring computers. The I/O data devices may be dual ported as shown or may be common to all computers in the ring, or a combination of both.

In the embodiment shown in FIG. 4, one of the computers 110a–110d may be designated as a spare and allowed to remain idle or run dispensable tasks. Each of the computers within the ring are coupled to two other adjacent computers, one of these adjacent computers being designated as the computer to the left and the other adjacent computer being designated as the computer to the right. When one of the computers in the ring fails, other than the spare, tasks of the failed computer are performed by the adjacent computer to the right, tasks of the computer to the right are performed by the computer to its right and so on until the designated spare computer is encountered and the rippling of tasks can stop.

It should be understood that the computers can also be configured as a chain, preferably with a standby computer at the end of the chain. In such an embodiment, reconfiguration of the system after a failure may be required to maintain a standby computer at the end of the chain. By configuring the set of computers as a logical ring, the need for reconfiguration is eliminated. Additionally, embodiments of the present invention described above, individual elements, including processors, memories, and I/O devices, of computer systems have been described as being interconnected by one or more memory buses. It should be understood that the memory buses may be replaced by other interconnecting mechanisms for transferring data, such as a cross-point switch, to accomplish the same function.

One advantage of this invention is that it provides fault tolerance to computers that have little or no internal redundancy (e.g., uniprocessors) by allowing checkpointing to be directed to a remote unit. Another advantage of this invention over prior art checkpointing systems is that checkpoints are established remotely in a second computer that is physically separated, and can be some distance away, from the computer being protected. Thus the concept of fault tolerance is extended to having single spare computer to serve as a backup to an arbitrary number of active computers. Yet another advantage of the invention is that neither application programs nor users need to be involved with, or even be aware of the checkpointing process. Very fast recovery is supported and protection against memory failures and other hardware and software faults is provided.

Given the embodiments of the invention described herein, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system comprising:

a first computer processing at least a first application, the first computer including:
- a processor having a cache, internal registers and an input/output event queue,
- a main memory subsystem coupled to the processor and cache,
- a write buffer coupled to the main memory subsystem that captures data written to the main memory,
- an external port, and
- an interface controller, coupled to the write buffer and the external port, that transfers data in the write buffer to the external port of the first computer,
- wherein the processor includes means for flushing the cache, internal registers and input/output event queue to the main memory subsystem and means for issuing a checkpoint instruction after flushing the cache, internal registers and input/output event queue;

a data communications link coupled to the external port of the first computer;

a second computer including:
- an external port coupled to the data communications link,
- an interface controller, coupled to the external port of the second computer to receive the data from the interface controller of the first computer,
- a main memory subsystem,
- a buffer memory, coupled to the interface controller of the second computer and the main memory of the second computer, that receives the data transferred from the write buffer of the first computer; and
- wherein data stored in the buffer memory is transferred to the main memory subsystem of the second computer upon receipt of the checkpoint instruction from the first computer, such that the main memory subsystem of the second computer maintains a consistent state from which processing of the first application can be restarted of the first computer.

2. The computer system of claim 1, wherein the second computer further includes:
- a processor coupled to the main memory subsystem; and wherein, upon a failure of the first computer, the second computer continues processing the first application of the first computer without data loss.

3. The computer system of claim 2, wherein the second computer processes at least a second application, and wherein processing of the second application is terminated when a failure occurs in the first computer.

4. The computer system of claim 2, wherein the second computer processes at least a second application, and wherein the second computer processes both the first and the second application when a failure occurs in the first computer.

5. The computer system of claim 2, wherein the second computer further includes:
- a write buffer coupled to the main memory subsystem that captures data written to the main memory subsystem of the second computer; and
- wherein the interface controller of the second computer transfers data contained in the write buffer of the second computer to the first computer, so that the main memory subsystem of the first computer acts as the shadow memory for the main memory of the second computer.

6. A computer system comprising:
- at least three computers, each of the computers except one spare computer performing data processing tasks;
- a data communications network coupled to each of the computers such that the plurality of computers are connected in a logical ring;
- wherein each computer includes a processor having a cache, internal registers and input/output event queue and connected to a main memory and a write buffer coupled to capture data written to the memory by the processor;
- means for flushing the cache, internal registers and input/output event queue to the main memory and means for copying data from the write buffer to the main memory of an adjacent computer in the logical ring at periodic checkpoints; and
- wherein upon failure of one of the computers performing data processing tasks, the data processing tasks of the computers performing data processing tasks are performed by functional computers of the computers including the spare computer without loss of data.

7. The computer system of claim 6, further comprising a plurality of dual ported I/O devices, each of the dual ported I/O devices being coupled to at least two of the plurality of computers.

8. The computer system of claim 6, wherein a number of computers performing data processing tasks are between the spare computer and the failed computer, and wherein the data processing tasks of the failed computer and each of the number of computers are performed by the next adjacent computer such that the spare computer performs the tasks of one of the number of computers.

9. A method for providing fault tolerance in a computer system having first and second computers, each of the first and second computers having a processor with a cache, internal registers and an input/output event queue an external port, a main memory and a buffer memory, the method including steps of:

capturing data written to the main memory of the first computer;

transferring the data over a data link to the buffer memory of the second computer;

flushing the cache, internal registers and input/output event queue of the processor of the first computer such that data contained within the cache, internal registers and input/output event queue is written to the main memory of the first computer and to the buffer memory of the second computer;

copying data from the buffer memory of the second computer to the main memory of the second computer such that a checkpoint is established and the main memory of the second computer acts as a shadow memory of the main memory of the first computer.

10. The method of claim 9, further comprising steps of:

processing a first application in the first computer; and processing the first application in the second computer upon failure of the first computer.

11. The method of claim 10 further comprising steps of:

processing a second application in the second computer; and terminating the processing of the second application upon failure of the first computer.

12. The method of claim 10 further comprising steps of:

processing a second application in the second computer; and processing both the first and the second applications in the second computer upon failure of the first computer.

13. The method of claim 9, further comprising steps of:

capturing data written to the main memory of the second computer;

transferring the data over a data link to the buffer memory of the first computer;

flushing the cache of the processor of the second computer such that data contained within the cache is written to the main memory of the second computer and the buffer memory of the first computer;

copying data from the buffer memory of the first computer to the main memory of the first computer such that a checkpoint is established and the main memory of the first computer acts as a shadow memory of the main memory of the second computer.

14. A computer system comprising:

a processor;

a main memory subsystem, coupled to the processor, including:

a primary memory element from which data is read and to which data is written by the processor;

a write buffer that monitors each time data is written to the primary memory element by the processor and stores buffer data related to the data written to the processor;

wherein the processor and the primary memory element are in a first computer and wherein the write buffer is in a second computer having a main memory subsystem and connected to the first computer by a communication link; means, using the buffer data, for ensuring the existence of a consistent checkpoint state in the main memory subsystem of the second computer to which processing can resume without loss of data integrity or program continuity following a fault; and wherein the processor has a corresponding input/output subsystem which provides input/output events initiated by the processor, wherein the processor has means for queuing input/output events between checkpoints and means for flushing the queued events to the primary memory element when a checkpoint is to be established, whereby input/output events are captured in checkpoint data in the main memory subsystem of the second computer.

* * * * *